(12) United States Patent
Cardno (10) Patent No.: US 10,061,991 B2
(45) Date of Patent: Aug. 28, 2018

(54) METHOD OF DATA VISUALIZATION AND DATA SORTING

(71) Applicants: NEW BIS SAFE LUXCO S.À R.L, Luxembourg (LU); Andrew John Cardno, San Diego, CA (US)

(72) Inventor: Andrew John Cardno, San Diego, CA (US)

(73) Assignee: New BIS Safe Luxco S.à.r.l., Luxembourg (LU)

(*) Notice: Subject to any disclaimer, the term of this patent is extended or adjusted under 35 U.S.C. 154(b) by 0 days.

(21) Appl. No.: 14/917,534

(22) PCT Filed: Sep. 9, 2014

(86) PCT No.: PCT/NZ2014/000193
§ 371 (c)(1),
(2) Date: Mar. 8, 2016

(87) PCT Pub. No.: WO2015/034378
PCT Pub. Date: Mar. 12, 2015

(65) Prior Publication Data
US 2016/0224846 A1 Aug. 4, 2016

Related U.S. Application Data

(60) Provisional application No. 61/875,451, filed on Sep. 9, 2013.

(51) Int. Cl.
*G06K 9/00* (2006.01)
*H04N 5/247* (2006.01)
(Continued)

(52) U.S. Cl.
CPC ....... *G06K 9/00785* (2013.01); *G06Q 50/265* (2013.01); *G06T 7/77* (2017.01);
(Continued)

(58) Field of Classification Search
None
See application file for complete search history.

(56) References Cited

U.S. PATENT DOCUMENTS 5,381,155 A * 1/1995 Gerber ............... G08G 1/017
340/936
7,421,335 B2 * 9/2008 Yoshikawa ........ G01C 21/3617
340/995.13
(Continued)

FOREIGN PATENT DOCUMENTS

WO 2009/023729 A1 2/2009
WO 2012/143848 A1 10/2012

OTHER PUBLICATIONS

Riehmann et al. "Interactive Sankey Diagrams," Proceedings of the IEEE Symposium on Information Visualization (InfoVis), pp. 233-240, 2005.*
(Continued)

*Primary Examiner* — Matthew Bella
*Assistant Examiner* — Soo Shin
(74) *Attorney, Agent, or Firm* — Merchant & Gould P.C.

(57) ABSTRACT

A method of displaying data in a data visualization computing system is described. Various methods of displaying the data are described including using a timeline, the data being aggregated based on time periods wherein the timeline consists of a plurality of time period sizes, the current selected time period covering the smallest time period, the period furthest on the timeline from the current selected period covering the largest time period, the timeline consisting of at least one time period of each time period size. Also described are improved methods of data selection and display.

12 Claims, 9 Drawing Sheets

(51) Int. Cl.
- *G06Q 50/26* (2012.01)
- *G06T 11/60* (2006.01)
- *G06T 11/20* (2006.01)
- *G06Q 50/00* (2012.01)
- *G06T 7/77* (2017.01)

(52) U.S. Cl.
CPC ............ G06T 11/206 (2013.01); G06T 11/60 (2013.01); H04N 5/247 (2013.01); *G06K 2209/15* (2013.01); *G06Q 50/00* (2013.01); *G06T 2207/10016* (2013.01); *G06T 2207/30252* (2013.01)

(56) References Cited

U.S. PATENT DOCUMENTS

| | | | | |
|---|---|---|---|---|
| 8,717,364 | B2* | 5/2014 | Cardno | G06F 17/30716 345/440 |
| 2008/0027639 | A1* | 1/2008 | Tryon | B60K 6/46 701/533 |
| 2009/0005984 | A1* | 1/2009 | Bradley | G01C 21/20 701/469 |
| 2013/0073970 | A1 | 3/2013 | Piantino et al. | |
| 2014/0365126 | A1* | 12/2014 | Vulcano | G01C 21/36 701/533 |

OTHER PUBLICATIONS

Simmons et al. "Hub Map: A new approach for visualizing traffic data sets with multi-attribute link data," 2015 IEEE Symposium on Visual Languages and Human-Centric Computing (VL/HCC).*
International Search Report for International Application for No. PCT/NZ2014/000193, dated Mar. 2, 2015 (6 pages).
Certified Copy of U.S. Appl. No. 61/074,347, filed Jun. 20, 2008 (228 pages).

* cited by examiner

METHOD OF DATA VISUALIZATION AND DATA SORTING

This application is a National Stage Application of PCT/NZ2014/000193, filed 9 Sep. 2014, which claims benefit of U.S. Ser. No. 61/875,451, filed 9 Sep. 2013 and which applications are incorporated herein by reference. To the extent appropriate, a claim of priority is made to each of the above disclosed applications.

FIELD OF THE INVENTION

The present invention relates to an improved method of data visualization to identify data of relevance.

BACKGROUND

Many factors may be taken into account when designing and creating a useful system for generating graphical visualizations of data retrieved from one or more sources. One such factor is to ensure that the representation of data in the visualizations is done so in a manner that enables a user to easily discern the relevant information from the data, or to interpret the data in such a way that is useful to the user. This becomes particularly relevant when analyzing extremely large sets of data, and more so when the large sets of data are skewed.

An object of the present invention is to provide an improved method of representing data.

A further object of the present invention is to provide an improved method of identifying the relevant data for display.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge.

SUMMARY OF THE INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements.

In one embodiment the invention consists a computer implemented method of displaying data in a data visualization computing system using a timeline, the data being aggregated based on time periods wherein the timeline consists of a plurality of time period interval sizes, the current selected time period covering the smallest time period interval, the period furthest on the timeline from the current selected period covering the largest time period interval, the timeline consisting of at least one time period of each time period interval size.

In another embodiment the invention consists in a computer implemented method of displaying the predicted paths of a vehicle the method consisting of the steps of: identifying the vehicle; identifying the current location and direction of the vehicle; identifying the likely destinations of the vehicle using historical data on the destinations the vehicle went when previously at the current location, when traveling in the current direction; and displaying the predicted vehicle paths to the likely destinations on a map.

In a further embodiment the invention consists in a computer implemented method of predicting whether or not a vehicle is being followed, comprising the steps of: receiving a request to identify if a vehicle is being followed; identifying the vehicles following the vehicle requesting the information; identifying the vehicles that are following that are outside their normal travel path; identifying the owners of the following vehicles that are outside their normal travel path; selecting vehicles that are potentially following based on the vehicle owner; and reporting the information on the vehicle and the vehicle owner of the potentially following vehicles.

In a further embodiment the invention consists in a computer implemented method of calculating and displaying a suggested pickup route for a plurality of vehicles driven by a driver, comprising the steps of: allocating a geographical district to each vehicle; identifying the volume of the items to be picked up; calculating the route based on the capacity of the vehicle and the volume of items to be picked up; and displaying a pickup route for the driver to follow.

In a further embodiment the invention consists in a computer implemented method of calculating and displaying the likely traffic congestion, comprising the steps of: obtaining historical data on traffic congestion on the monitored route; based on the historical data predicting the likelihood of congestion; and providing a recommendation on the preferred lane direction to minimise traffic congestion.

In a further embodiment the invention consists in a computer implemented method maximising car parking revenue, comprising the steps of: obtaining historical data car park usage; based on the historical data predicting the likely car park demand; and providing a recommendation on car park charges to maximise revenue.

BRIEF DESCRIPTION OF THE DRAWINGS

Embodiments of the present invention will now be described, by way of example only, with reference to the accompanying drawings, in which.

DETAILED DESCRIPTION OF THE INVENTION

The following described invention is suitable for use in conjunction with other methods, and the incorporation into one or more systems, for example as described in METHODS, APPARATUS AND SYSTEMS FOR DATA VISUALISATION AND RELATED APPLICATIONS (earlier filed by the applicant in the entirety as U.S. provisional patent application Ser. No. 61/074,347 filed on Jun. 20, 2008), which is incorporated by reference.

Embodiments of the present invention are described herein with reference to a system adapted or arranged to perform various methods of creating graphical representations of data.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a gaming data analysis computer, a retail environment analysis computer, a manufacturing data analysis computer, a business intelligence computer etc., where the computer has been specifically adapted to perform the described steps on specific data captured from an environment associated with a particular field.

Figure 1:
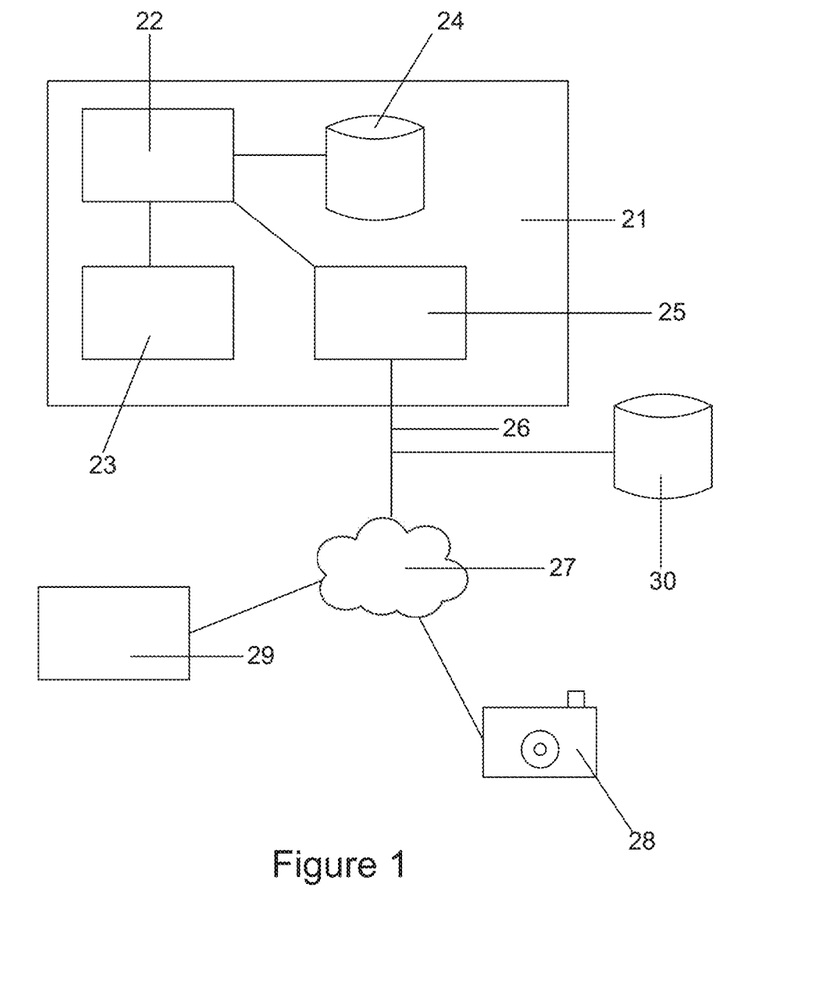
FIG. 1 shows a shows a system block diagram of a data visualization system according to an embodiment of the present invention.

Referring to FIG. 1 the an exemplary system is shown, a system server 21 including a CPU 22, memory 23, storage such as a hard drive 24 and a communication device 25 such as an Ethernet controller. The system server 21 is preferably connected to a communications network 26 to allow the system server 21 to send and receive information from a plurality of sensors 29 and cameras 28. The system server 21 may be connected to various sources of data 30 such as vehicle license plate information or sales information from retail outlets. It is to be understood that various changes and modifications may be made without departing from the scope of invention in particular various other sources of data may be made available to the system.

Timeline Display

Figure 2:
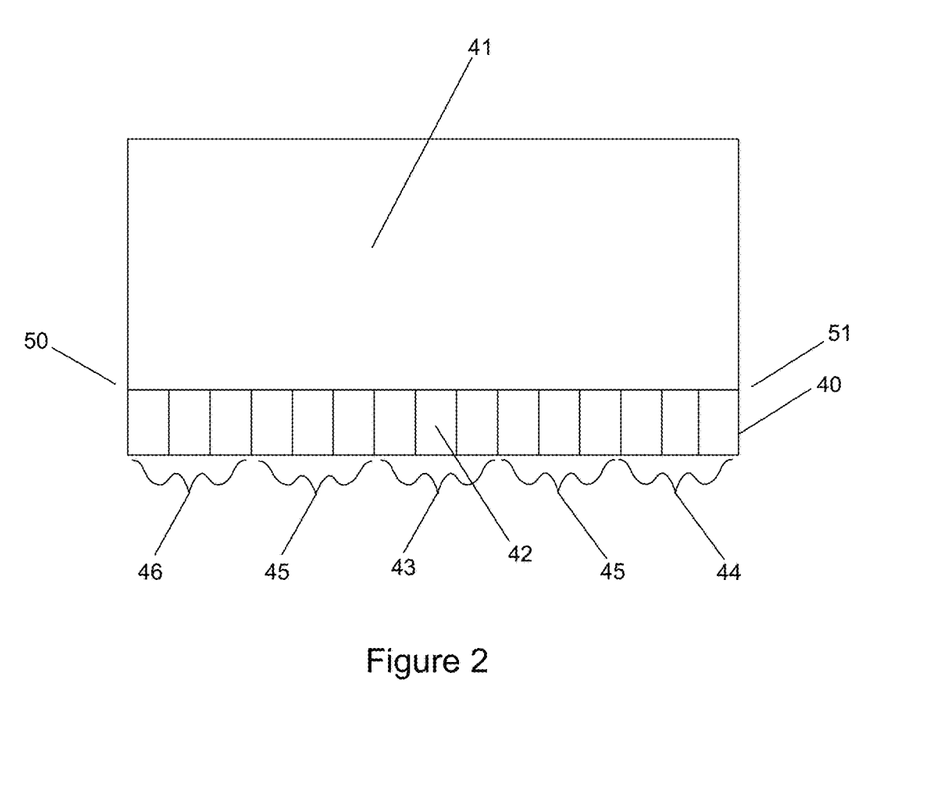
FIG. 2 show an exemplary interface showing the timeline display of the present invention.

Referring to FIG. 2 a method of displaying data 41 using a timeline 40 is illustrated. The displayed data is aggregated based on time periods. The displayed timeline 40 has a number of time period intervals 43 to 46.

The time periods are of differing sizes. The current selected time period 42 covers the smallest time period interval, for example an hour. There would typically be multiple periods 43 having the same time period interval (for example an hour). The time periods 43 nearest the selected period 42 could utilise the same period size.

The time periods furthest 44, 46 on the timeline 40 from the current selected period 42 would cover the largest time period interval for example a week in the case of period 46 and a day in the case of periods 44.

Time periods 45 between the current selected period 42 and the furthest periods 46 would have a time period interval between the time period interval of time periods 46 and time periods 43. For example the time period interval for those periods 45 between may be a day.

The timeline display has been illustrated with the selected time period substantially in the centre but the selected time periods may further to the left 50 of the timeline 40 or further to the right 51 of the timeline.

The timeline 40 consists of a plurality of time periods of each time period interval size.

The time period interval sizes may be user selectable or selected by the system 21 based on the data and the information to be displayed. Further the number of time period interval sizes may be user selectable or selected by the system 21 based on the data and the information to be displayed.

Time periods interval sizes that may be used includes seconds, minutes, hours, days, weeks, months, years. Further the time period interval size may be set by a user to a number of seconds, a number of minutes, a number of hours, a number of days, a number of weeks, a number of months, and a number of years. To enable the user to define the time period interval sizes a user interface may be provided.

When a user changes the selected time period 42 the display is redrawn in response to a change in the selected period 42.

Predicted Paths of a Speeding Vehicle

Figure 3:
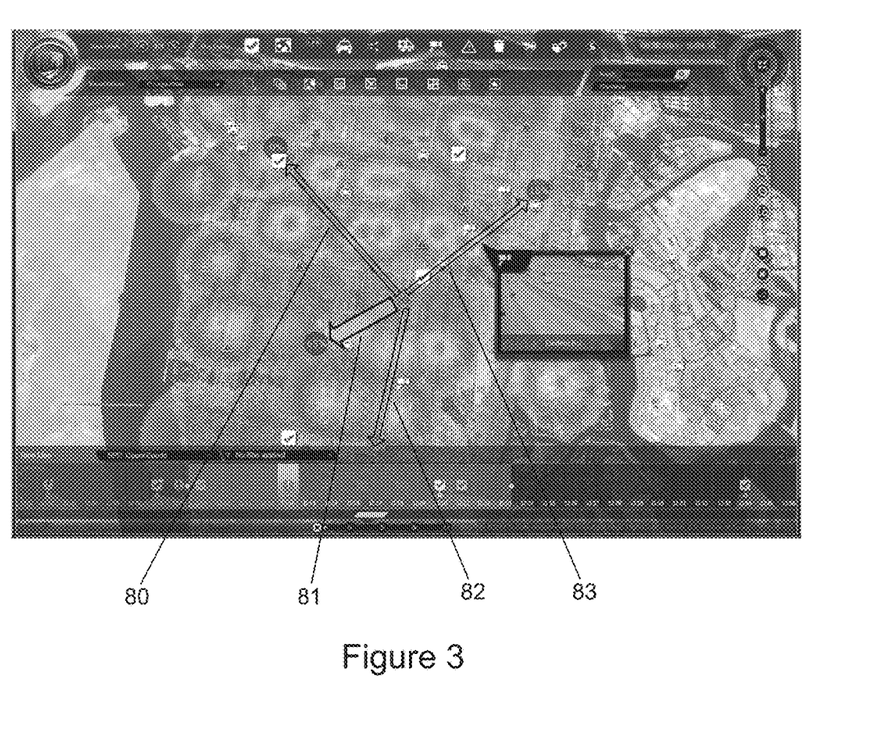
FIG. 3 show an exemplary interface showing the predicted route of a speeding driver.

In a further embodiment referring to FIG. 3 the present invention calculates and displays the predicted paths 80 to 83 of a vehicle, usually a speeding vehicle.

The ability to predict the path of a speeding vehicle means that the enforcement officers can plan on a suitable location to apprehend the vehicle rather than have to chase the vehicle and risk causing an accident.

The system 21 of the present invention using a plurality of cameras 28 records vehicle identification plates and locations. As the locations of the cameras 28 are known the path of a vehicle can be identified by identifying the time a vehicle is recorded by a camera and following the recorded locations in time sequence.

Figure 4:
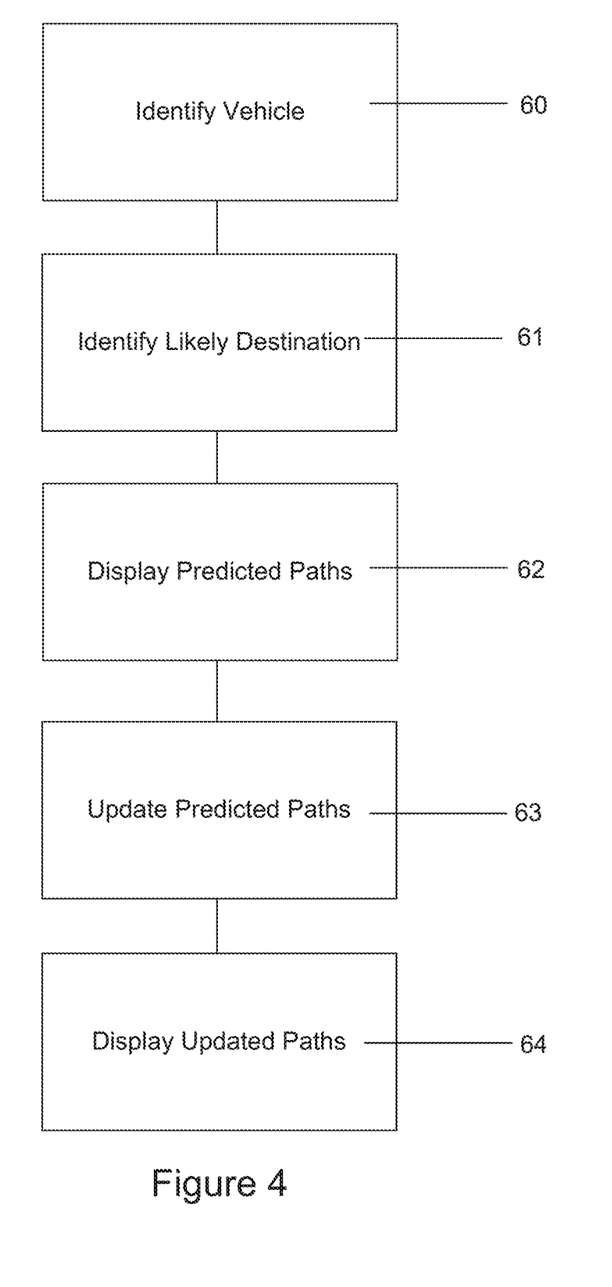
FIG. 4 is a flow diagram of the predicted route method of the present invention.

Referring to FIG. 4 in order to predict the path to be followed by a vehicle the system 21 first identifies the current location and direction of the vehicle 60. The system 21 then identifies the likely destinations of the vehicle using historical data (previously collected and stored) on the destinations the vehicle went, when previously at the current location, when traveling in the current direction 61.

Once the system has identified the likely destinations the system displays the predicted vehicle paths to the likely destinations on a map 62.

In one embodiment of the invention the predicted vehicle paths are displayed as a sankey diagram as seen in FIG. 3. Each sankey path 80 to 83 is reflective of the probability that a particular path will be followed by the vehicle being tracked.

The system 21 updates 63 the predicted vehicle paths in response to identifying a new current location and direction of the vehicle and redraws the paths 64.

Likely destinations of the vehicle are calculated using information including time information and the probability of a particular path being followed is weighted based on the time information. The time information used includes time of day, day of the week and season information. Season information includes for example whether or not it is a religious occasion such as Ramadan.

VIP Trailing

Figure 5:
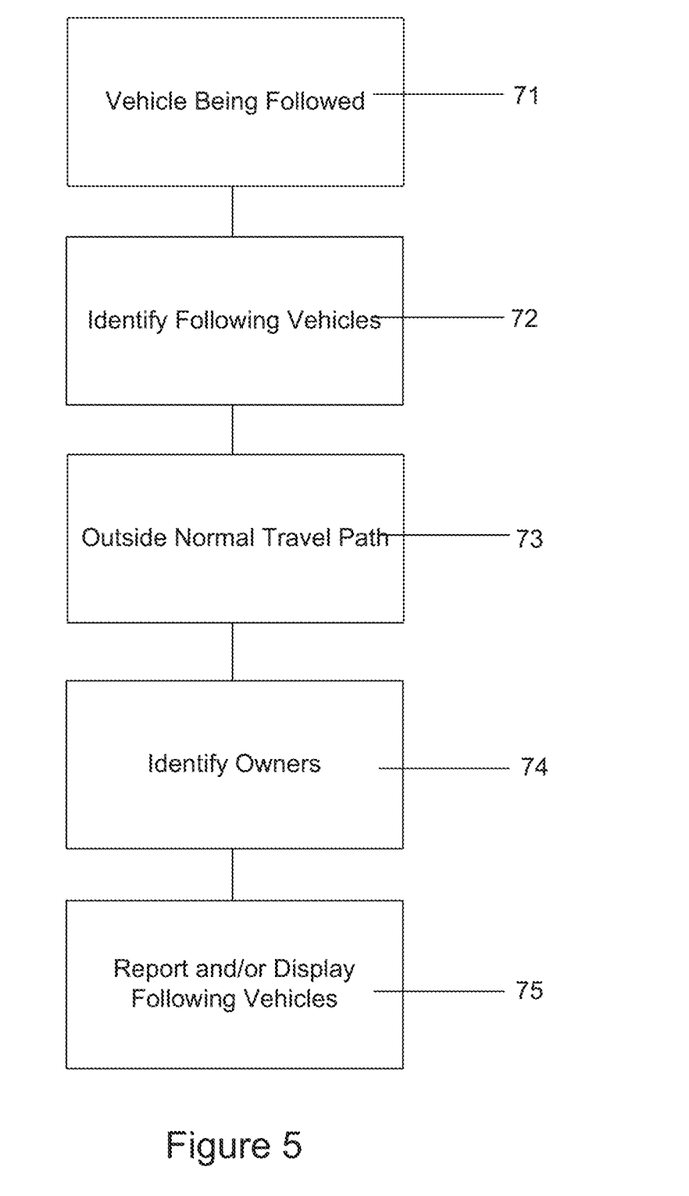
FIG. 5 is a flow diagram of the VIP following vehicle identification method of the present invention.

In a further embodiment referring to FIG. 5 the present invention calculates the probability that a vehicle is being followed.

In ordered to identify if a vehicle is being followed the system 21 first needs to receive a request to identify if the vehicle is being followed 71 (the VIP vehicle). The system then identifies 72 the vehicles following the vehicle which requested the information. The identification is done using the cameras in the location of the VIP vehicle and number plate recognition. Then using the system 21 historical database the system identifies the normal travel path of the following vehicles and identifies which vehicles are traveling outside their normal travel path 73.

From the list of vehicles outside their normal travel path the system 21 then using a database of vehicle ownership identifying the owners of vehicles 74. From the list of vehicle owners the system using information on the owners can optionally make a further risk assessment.

The system then reports 75 the likely following vehicles to the requester. The system may also display the information to a system operator to allow the operator to make an assessment.

As per the above method of calculating the likely path of a speeding vehicle the system predicts the normal travel path using time information, including time of day, day of the week and season information. Season information includes for example whether or not it is a religious occasion such as Ramadan, a holiday period or a normal weekday.

Waste Management

Figure 6:
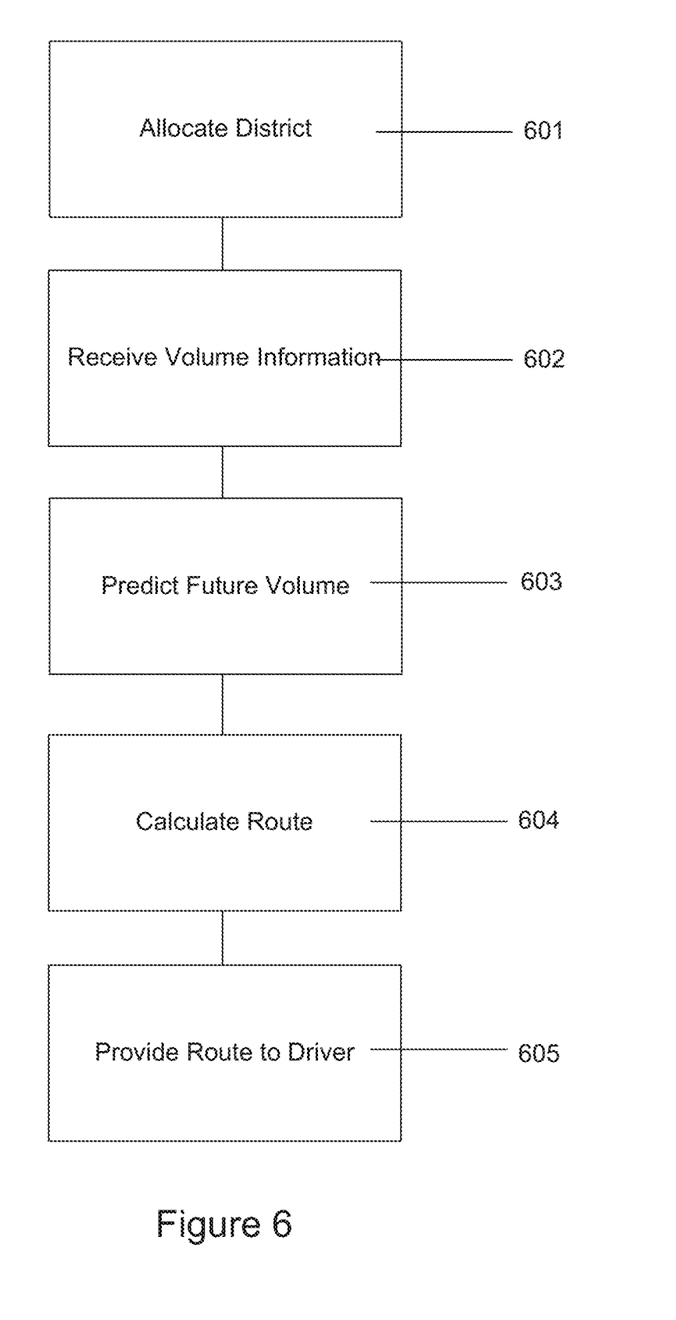
FIG. 6 is a flow diagram of the Waste Management vehicle routing method of the present invention.
Figure 7:
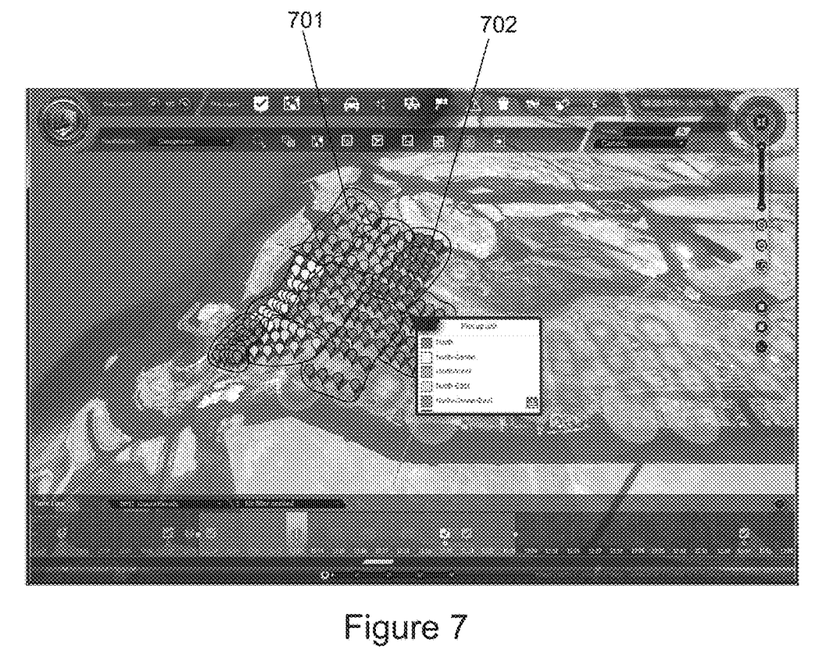
FIG. 7 shows an exemplary interface of the Waste Management vehicle routing method.
Figure 8:
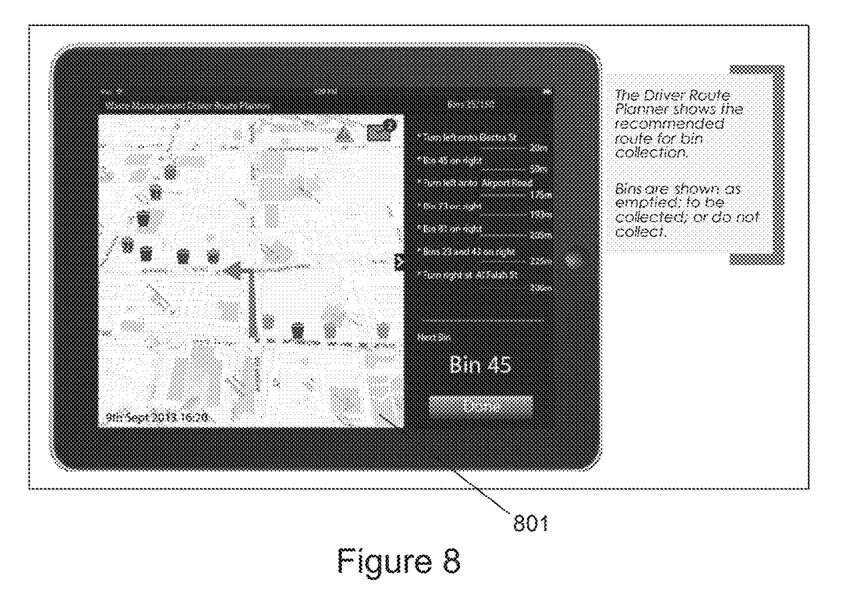
FIG. 8 is an exemplary interface of the Waste Management vehicle routing driver display.

Referring to FIGS. 6 to 8 the present invention implements a method calculating and displaying a suggested pickup route for waste recovery vehicles driven by a driver. While described with reference to the collection of waste from waste bins 701 by waste collection trucks the invention is equally applicable to managing other pickup routing for other items such as the pickup of mail from mail boxes.

Referring to FIG. 6 the system 21 allocates 601 a geographical district to each vehicle, the geographical districts having previously been entered into the system 21 by an administrator. In order for the system 21 to calculate the preferred route the system needs to estimate the volume of waste to be picked up. The volume of waste to be picked up can be calculated based on historic data or based on information provided 602 by sensors in the waste bins which provide information to the system 21. The sensors in the bins indicate the volume of waste contained in each bin. The volume of waste may be calculated based on a combination of historic data and the current volume of waste as indicated by the sensors or as collected by the trucks.

Further the system 21 can calculate the likely volume of waste at a given future time based on the current volume and the historic volume collected. The likely volume prediction is based on information including the day of the week and season information. Season information includes for example whether or not it is a religious occasion such as Ramadan or a non-religious holiday which may historically result in more waste.

Using the information available the system calculates the waste volume 603 and then calculates the route 604 taking into account factors such as the capacity of the vehicle, the volume of items to be picked up and the desired pickup time. Information on the vehicle capacity having be previously provided to the system 21 by an administrator.

The desired pickup time of a given waste bin 701 may be optimised to maximise the efficiency of the vehicle, maximise the amount of waste collected or on busy days to minimise the number of collections.

Once the system has calculated the route, the pickup route is provide to the vehicle driver. FIG. 8 shows the route directions 801 provided to a driver. The directions would typically be displayed 605 on a screen visible from the driving position of the vehicle.

Depending on factors such as waste volume and traffic congestion the geographical district 702 allocated to each vehicle, the suggested route of each vehicle can be altered and an updated route displayed to the drivers.

In the event of a breakdown or other factors the geographical district 801 allocated to each vehicle is editable by a user and the system in response to the editing will update the suggested route. While the geographical district 801 may be edited by a user in response to changing conditions in the normal course of events the system 21 will detect a change by monitoring pickup and waste volumes and the system will make the changes without user intervention.

Other Embodiments

Figure 9:
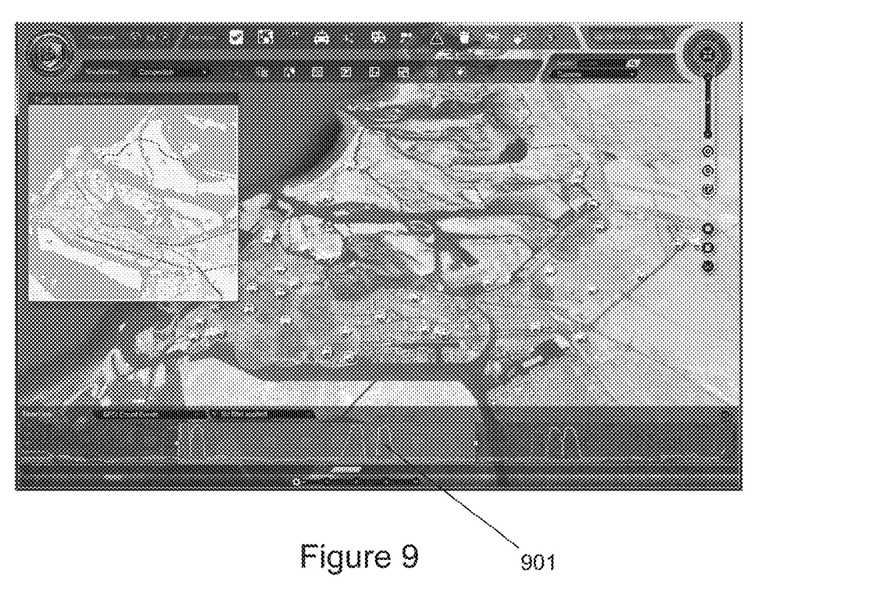
FIG. 9 is an exemplary interface of the Traffic Congestion information display interface.
Figure 10:
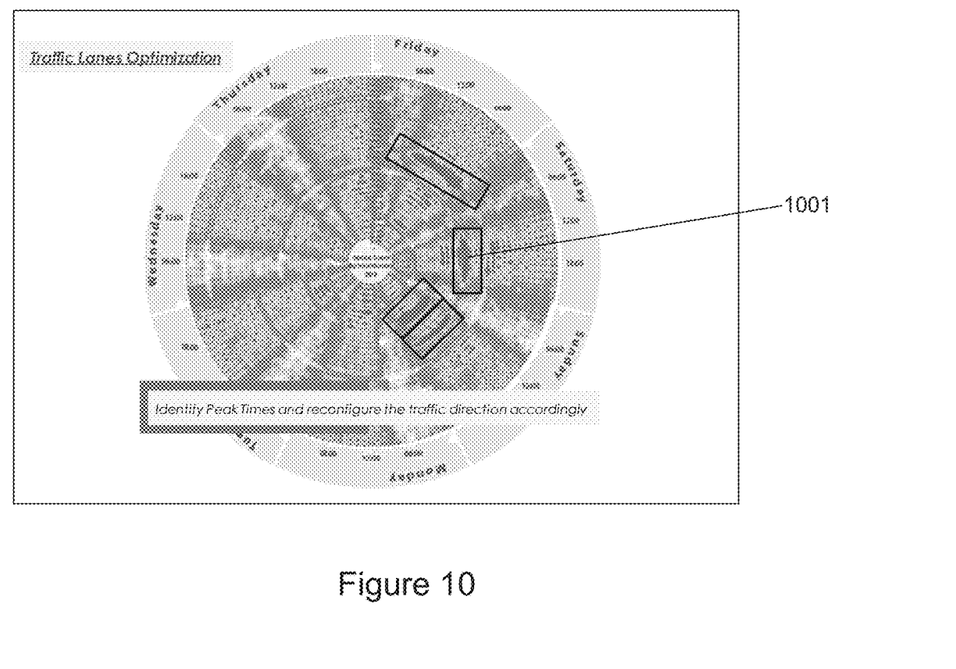
FIG. 10 is a graphic of the system showing traffic congestion periods.
Figure 11:
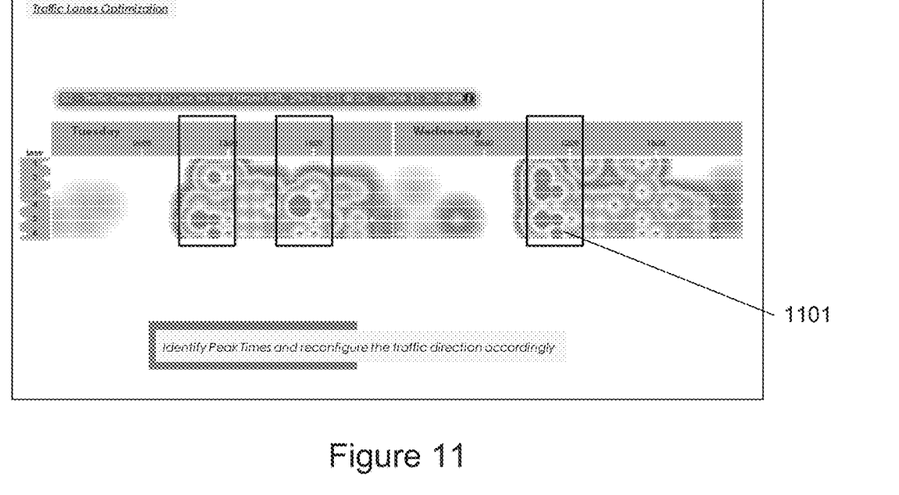
FIG. 11 is a further graphic of the system showing traffic congestion.

Other embodiments of the present invention include using historical data to identify traffic congestion, referring to FIG. 9 an exemplary interface identifying the main arterial routes and the traffic congestion periods 901 is shown. The data congestion periods are further shown in more detail 1001 and 1101 in FIGS. 10 and 11. In order to calculate congestion the system uses the historical data received from the cameras of the system to calculate traffic volume. Based on the traffic volume the system can provide recommendations on whether the direction of a lane should be changed, if a lane direction change is possible on the route.

Figure 12:
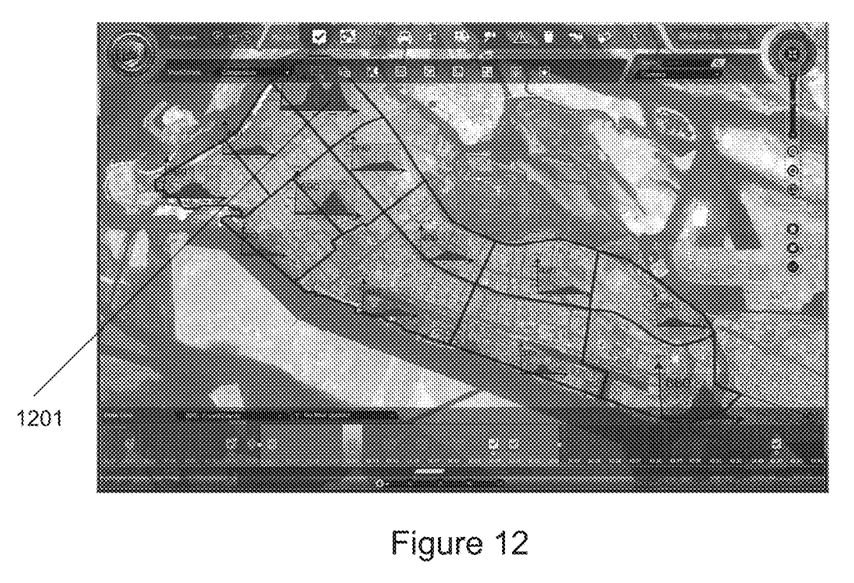
FIG. 12 is an exemplary interface of the Car Park usage display interface.

In a further embodiment the present invention can be utilised to maximise car parking revenue. In order to predict car parking demand the system 21 utilises information on current car parking usage, historic car parking usage base on relevant historical data such as the day of week, events occurring and the season. Such information may be obtained from data received from the car parks or from cameras located near the car parks that can identify a car entering and existing a car park. Data on the direction cars are currently traveling and their predicted destination may also be used in predicting car park demand. Referring to FIG. 12 an exemplary interface identifying likely car park usage 1201 is shown.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

I claim:

1. In a data visualization computing system, implemented on an electronic computing device, a computer implemented method of displaying predicted paths of a vehicle and predicting whether or not the vehicle is being followed, the method consisting of the steps of:
    identifying the vehicle;
    identifying current location and direction of the vehicle;
    identifying likely destinations of the vehicle using historical data on destinations the vehicle went when previously at the current location, when traveling in the current direction;
    rendering predicted vehicle paths to the likely destinations as a Sankey diagram overlaid on a map, wherein a thickness of each Sankey path is reflective of a probability that a particular path will be followed;
    displaying the rendered predicted vehicle paths on a display;
    receiving a request to identify if the vehicle is being followed;
    identifying potentially following vehicles, being vehicles different from the vehicle;
    identifying the potentially following vehicles that are outside their normal travel path;
    identifying owners of the potentially following vehicles that are outside their normal travel path;
    selecting potentially following vehicles based on the owners of the potentially following vehicles; and
    displaying information on each potentially following vehicle and the vehicle owner of each potentially following vehicle.

2. The method of claim 1 wherein the potentially following vehicles are identified by a vehicle license plate.

3. The method of claim 2 wherein the potentially following vehicles are identified based on a plurality of camera images, from a plurality of cameras at known camera locations.

4. The method of claim 3 wherein the normal travel path of each potentially following vehicle is obtained from the historical data on the potentially following vehicle and is based on information stored on the potentially following vehicle in a database, the historical data being a plurality of historical camera images of the potentially following vehicle, from the plurality of cameras at known camera locations.

5. The method of claim 4 wherein the step of identifying the normal travel path includes using time information.

6. The method of claim 5 wherein the time information used includes time of day, day of week and season information.

7. In a data visualization computing system, implemented on an electronic computing device, a computer implemented method of displaying predicted paths of a vehicle, the method consisting of the steps of:
    identifying the vehicle, wherein the vehicle is a speeding vehicle and the vehicle is identified by a vehicle license plate;
    identifying current location and direction of the vehicle, wherein the current location and direction of the vehicle are identified based on a plurality of camera images, from a plurality of cameras at known camera locations;
    identifying likely destinations of the vehicle using historical data on destinations the vehicle went when previously at the current location, when traveling in the current direction, wherein the historical data on the vehicle is based on information stored on the vehicle in a database, the historical data being a plurality of historical camera images, from the plurality of cameras at known camera locations and wherein identifying the likely destinations of the vehicle includes using time information, the time information including time of day, day of week and season information and wherein the probability of a particular path includes a weighting based on the time information;
    rendering predicted vehicle paths to the likely destinations as a Sankey diagram overlaid on a map, wherein a thickness of each Sankey path is reflective of a probability that a particular path will be followed;
    displaying the rendered predicted vehicle paths on a display;

updating the predicted vehicle paths in response to identifying a new current location and direction of the vehicle;
receiving a request to identify if the vehicle is being followed;
identifying potentially following vehicles, being vehicles different from the vehicle;
identifying the potentially following vehicles that are outside their normal travel path;
identifying owners of the potentially following vehicles that are outside their normal travel path;
selecting potentially following vehicles based on the owners of the potentially following vehicles; and
displaying information on each potentially following vehicle and the owner of each potentially following vehicle.

8. The method of claim 7 wherein the potentially following vehicles are identified by the vehicle license plate.

9. The method of claim 8 wherein the potentially following vehicles are identified based on the plurality of camera images, from the plurality of cameras at known camera locations.

10. The method of claim 9 wherein the normal travel path of the potentially following vehicle is obtained from the historical data on the potentially following vehicle and is based on information stored on the potentially following vehicle in a database, the historical data being a plurality of historical camera images of the potentially following vehicle, from the plurality of cameras at known camera locations.

11. The method of claim 10 wherein the step of identifying the normal travel path includes using time information.

12. The method of claim 11 wherein the time information used includes time of day, day of week and season information.

* * * * *